United States Patent [19]
Peterson

[11] 3,853,194
[45] Dec. 10, 1974

[54] DUAL SYSTEM CIRCUIT POWER MEANS

[76] Inventor: Adolphe C. Peterson, 4623 Bruce Ave., Minneapolis, Minn. 55424

[22] Filed: Sept. 11, 1970

[21] Appl. No.: 71,580

[52] U.S. Cl................ 180/7 J, 180/65 A, 180/66 A
[51] Int. Cl............................................ B62d 57/00
[58] Field of Search............ 180/7 J, 65 A, 66 A, 67

[56] References Cited
UNITED STATES PATENTS

| | | | |
|---|---|---|---|
| 2,724,450 | 11/1955 | Kamps | 180/7 J |
| 2,758,661 | 8/1956 | Peterson | 180/65 A X |
| 3,191,707 | 6/1965 | Peterson | 180/66 A X |
| 3,525,874 | 8/1970 | Toy | 180/65 A X |

FOREIGN PATENTS OR APPLICATIONS 167,472  1/1951  Austria ............................ 180/66 A Primary Examiner—Leo Friaglia
Assistant Examiner—Randall A. Schrecengost

[57] ABSTRACT

A vehicle propulsion system including as elements thereof—A pressurized work fluid generator—B a primary engine unit receiving driving fluid from the fluid generator and producing propulsion for a vehicle by division of the work energy, thereby producing kinetic energy driving road-wheel means as one propulsion effect and simultaneously producing propulsion effect by a supplementary propulsion system.

6 Claims, 6 Drawing Figures

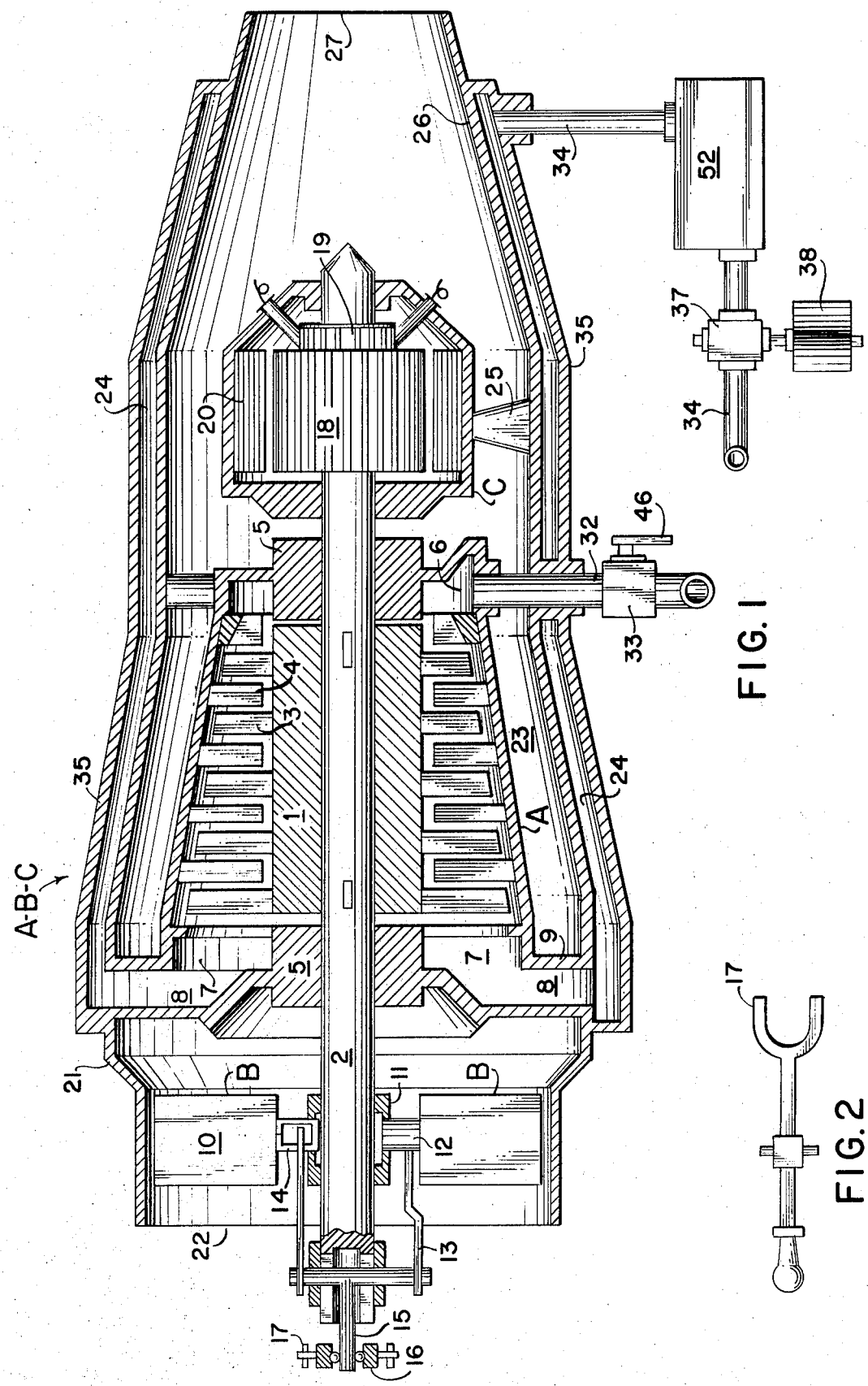

DUAL SYSTEM CIRCUIT POWER MEANS

My invention relates to propulsion of vehicles which may be classed as land vehicles and relates especially to a system employing a work fluid as distinguished from a combustion fluid from which power is derived and is called—Dual System Circuit Power Means.

There is in current time a need for elimination or reduction of pollution contained in combustion gases as in presently used automotive power systems of internal combustion engines. One possibility to effect such elimination or reduction is the possibility of substitution of so-called external combustion power in place of internal combustion power.

In use of external combustion for creation of power for propulsion, it seems that a form of turbine power means may be used in connection with external combustion for power generation. The very high speed of small turbine power means results in high cost and difficulty in use of turbines and complication of transmission of power and complication in speed reduction and application and therefore, a means for simplification of power transmission or application is essential for realization of use of turbine power with its advantage in the way of lightness of weight and decrease of construction cost.

A chief object of this invention is provision of a means whereby power of a high speed turbine can be transferred and transformed to vehicle propulsion on roadways and this objective is realized by use of a dual manner of propulsion, one of which is transmission by electric drive to road wheels and the other of which is utilization of propelled and ejected air as a propulsion agent. This objective is attained by a simple and effective means.

The objective is attained by a system which is relatively low in weight, relatively less costly than a complicated gear transmission system, and is attained by a system which is especially adapted to the automobiles used for individual or family use for high speed highway travel.

Another objective is provision of an external combustion system of power generation and transmission with the possibility of at least some reduction of pollution elements in the combustion exhaust. The objective is in general improvement in means for power generation and in power transmission and conversion to vehicle travel ability as it is especially associated with freeway travel and as it is especially associated with high speed cruising, and especially to accomplish these objectives by means which may be more acceptable as less objectionable and as also relatively less costly in manufacture and also in use.

The principal devices and combination of devices constituting my invention are as illustrated in the accompanying drawings which show my invention in several forms and in which like characters refer to like parts in so far as is practicable.

Referring to the drawings.

FIGS. 1, 2, 3, illustrate one form of my device, and of these figures, FIG. 1, is a view in vertical section through the operative axis of the several units comprising the power conversion means, this showing such means in large view and without showing the pressure work fluid generator means;

FIG. 2 is a detail illustration of lever 17 of FIG. 1.

FIG. 3, is a view in much reduce scale of an automobile chassis, including pressure work fluid generator, the power conversion unit, and the electric motor drive to road wheels, this view being a plan view and diagrammatic only in character.

FIG. 5 showing the diagrammatic assembly on the chassis of the second form; and FIG. 6, showing the electric motor association with road wheels and drive shaft thereto.

Figure 3:
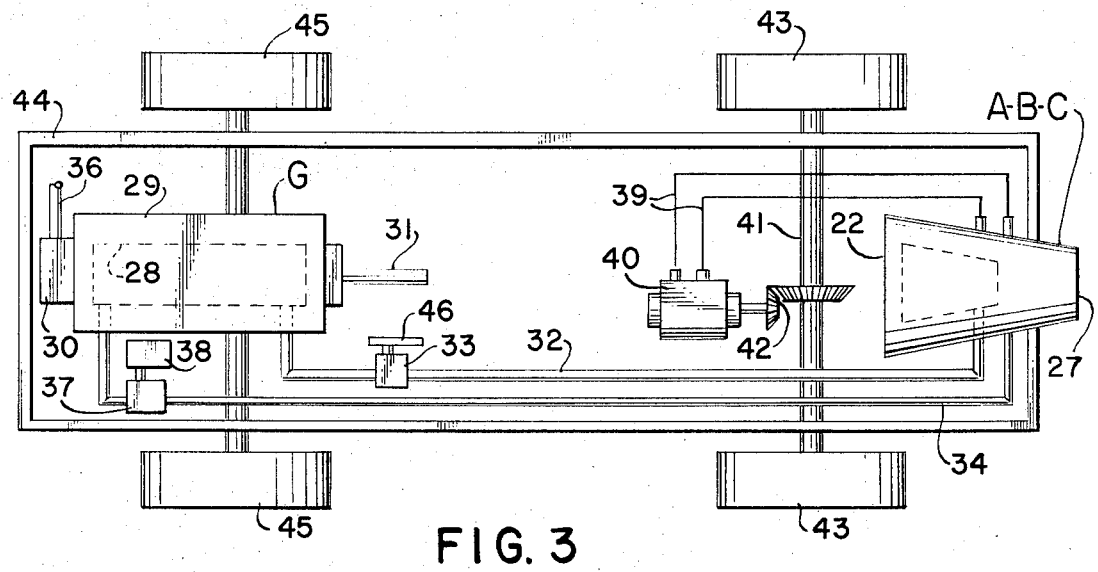

The form of my device which is illustrated in FIGS. 1, 2, 3, is a more simple assembly of the units, and is first described. FIG. 1 shows the power conversion means of this form, and there is included in FIG. 1, three chief units, a fluid turbine -A- which has turbine rotor 1, turbine shaft 2, rotor blades 3, stator blades 4, bearings 5, work fluid inlet 6, (inlet chamber), work fluid exhaust chamber 7, exhaust conduits 8 formed in mounting brackets 9; an air-fan -B- which has air blades 10, each fixed on hub 11 by rotatable axles 12, connectors 13 which connect cranks 14 of the air blades with an axially shiftable member 15 shiftable by ball-bearing 16 as moved by lever 17; and electric generator rotor (armature) 18, having commutator 19, field 20 this unit being called unit -C-.

The units are contained within turbine and air casing 21 which includes air intake 22 at frontal end, air-by-pass 23 (annular in form) condenser chamber 24 (annular in form), external wall 35 for condenser 24 (annular in form), mounting bracket 25 for electric generator, jet propulsion nozzle 26 (cylindrical and converging in form) jet nozzle discharge 27. Atmospheric air may enter at air intake 22 and flow through by-pass 23, jet propulsion 26, and jet nozzle discharge 27 to atmosphere, and this flow is of the type usually used in connection with air-fans.

Referring now to FIG. 3, the units -A-,-B-,-C- are diagrammatically shown at unit designated -A-B-C- FIG. 3, and this power conversion means is in FIG. 3 shown as connected with the pressure work fluid generator designated -G- in FIG. 3, wherein the generator coil means is indicated by dotted form 28 and is contained in combustion furnace casing 29, which has air intake 30 for combustion air, gas discharge 31, fuel nozzle and delivery 36. The generator unit -G- has work fluid flow by pipe 32, as controlled by valve 33, to inlet chamber 6 turbine -A-. The turbine -A- has discharge flow by the passages 8 in the brackets to the condensor chamber 24 where the work fluid is condensed and the work fluid returns as condensed by pipe 34 to generator coil 28.

The pipe 34 has interposed in it a pump-compressor 37 driven by electric motor 38 which is a controlled motor and is proportioned and is controlled to produce a low pressure or pressure below atmosphere and to return the work fluid as condensed 24 to the generator coil 28. Such pump-compressor means is controlled in any manner as is most suitable in the particular construction, and may be of any well known kind, such means being commonly known and used for controls. The valve 33 is controllable by lever 46, the latter being in turn subject to control by any type of remote control means, or it may be directly controlled manually or automatically according to need in the particular construction. The pump-compressor 37 by suction may produce a partial vaccuum in the condenser chamber 24 and will produce a pressure of fluid in the generator coil 28 which will be the working pressure of the work fluid, and this pressure may be as high as has been known to be practicable and most efficient in the turbine inlet chamber 6, and that pressure may in some constructions be as high as 600 or more pounds per square inch as the delivery pressure to turbine inlet chamber 6, and in any construction will be determined according to what is most suitable and efficient for the particular construction.

The electric generator unit -C- is connected for current flow by the electric conductors 39 to the electric motor 40 (FIG. 3) and this connection of the generator with the motor will include any well known means of controlling flow, according to the particular construction, such control means being well known and used in electric generating and motor means. It may include drive reversal.

The electric motor 40 drives rotatable shaft means 41 through gear means of bevel kind, designated 42 and thereby may drive road wheels 43 of teh vehicle having the chassis 44. In this form of the devices the unit -A-B-C- is mounted in the rear part of the chassis 44 and in such manner that the jet nozzle 27 directs air-flow rearwardly of the vehicle in travel normally, and so that in reverse flow as hereinafter explained there will be flow from rearwardly of the vehicle into the jet nozzle 26 at 27 and flow of the air outwardly and forwardly at 22, this reverse flow being for braking of the vehicle. The front wheels 45 of the vehicle will be steering wheels, such steering means being not shown, as this is commonly known.

Figure 5:
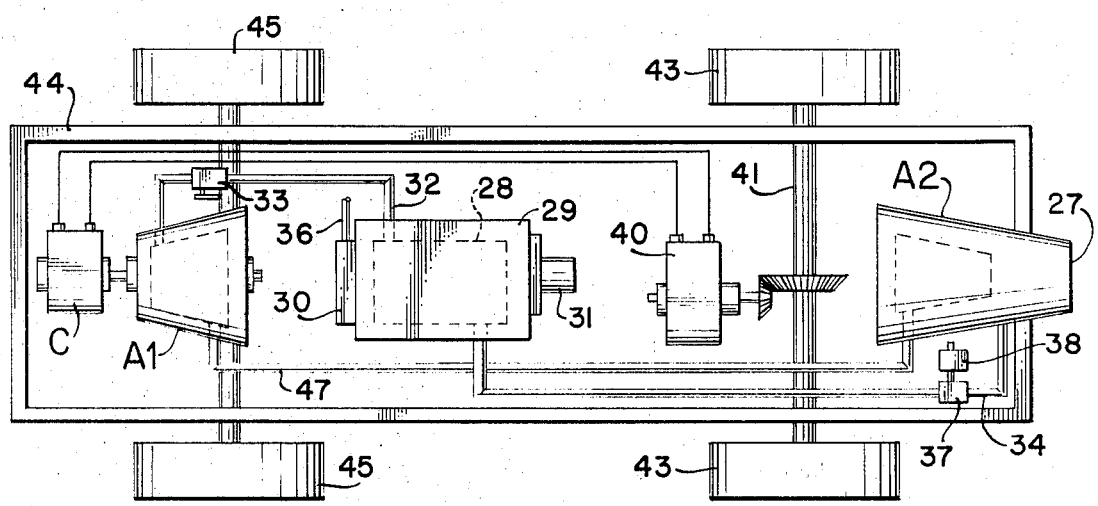
FIGS. 4, 5, 6, illustrate a second form of the means and system, this form including a division of the power conversion means into two units, including the pressure work fluid generator.
Figure 6:
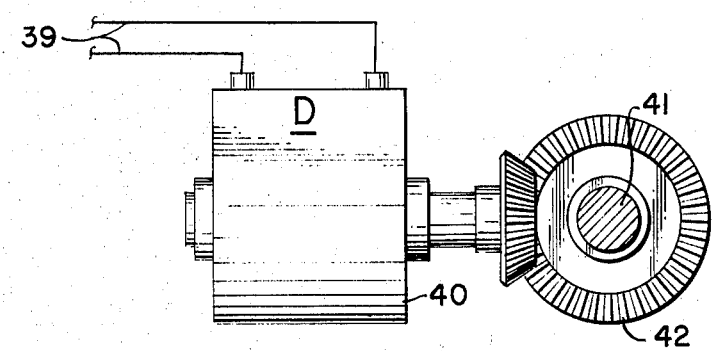
Figure 4:
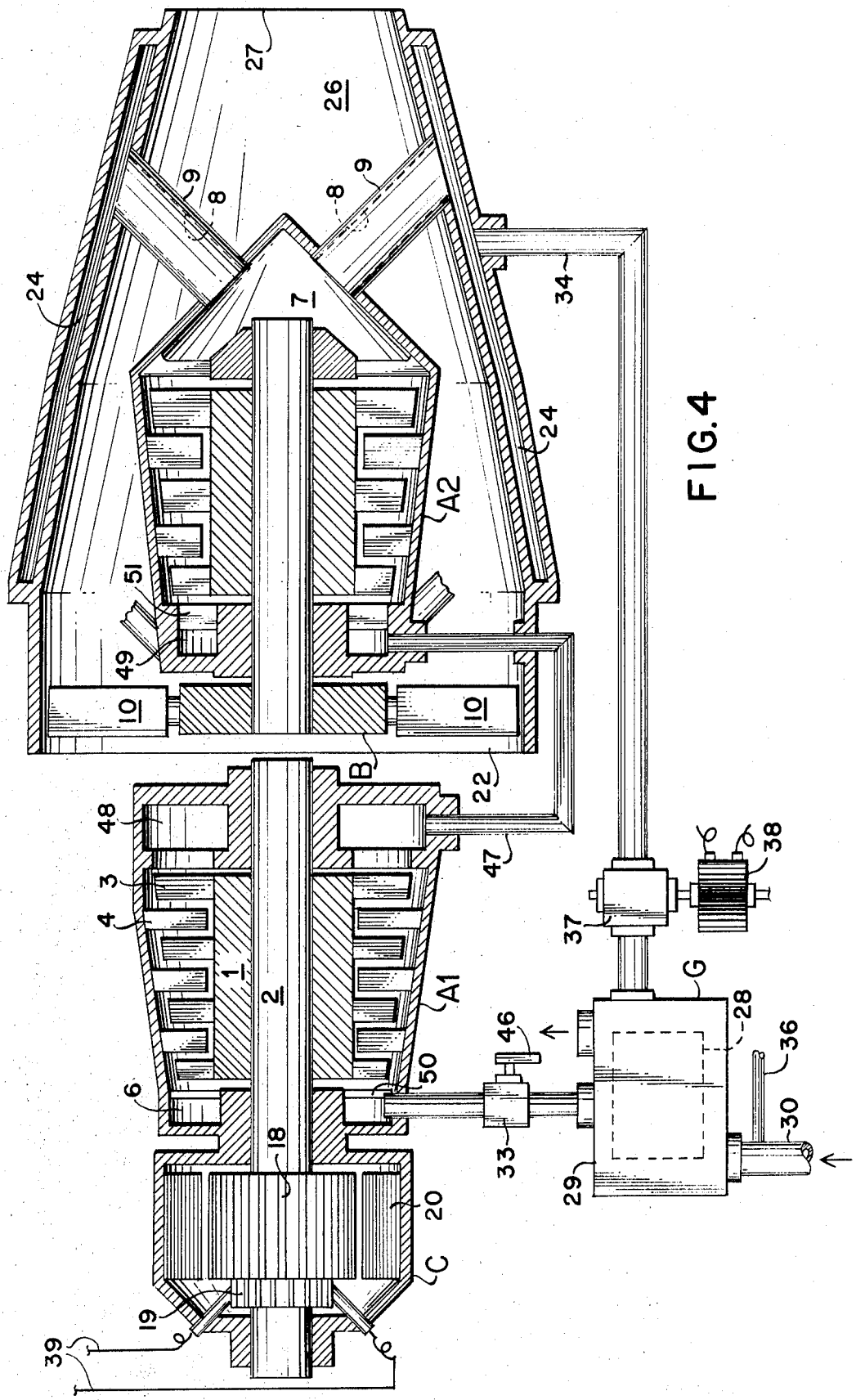

Referring to FIGS. 4 and 6, and 5, these figures relate chiefly to the second form of my device. Explanation of the general use and operation of each of the forms will be discussed, after a specific description of the second form. This second form of the device, is in general operation and principle of substantial similarity to the first form described. This second form, however, has one predominantly differing construction and operation and this consists in a separation of the turbine power means into two sections, one of which is a high pressure turbine designated -A$^1$- and the other is a low pressure turbine, designated as -A$^2$-. The flow of the pressure work fluid is through the high pressure and the low pressure turbines A$^1$ and A$^2$ in that sequence, the fluid flow being in sequence to the first, high pressure, and then to the low pressure, the flow being then as exhausted to the condensor chamber 24 for condensation and return to the generator -G-. The high pressure turbine A$^1$ drives the electric generator -C- for current generation, and the low pressure turbine A$^2$ drives the air-fan -B- which inducts the atmospheric air so that the air flows through jet duct 26 and discharge at jet nozzle 27. The flow of condensed work fluid is by the pipe 34, pump-compressor 37 and return to pressure generator coil 28 for pressure fluid generation. The flow of work fluid, in the second form will, in the divided turbine sections A$^1$ and A$^2$ provide for longer more expanded flow of the work fluid from high to low pressure turbines.

For further description of the second form, the parts or elements and units are designated by numerals as in the first described form, with however the differences as above mentioned with regard to the high presure and low pressure divisions of the turbine means. Parts in the FIGS. 4, 5, 6, bearing similar numbers as in the FIGS. 1, 2, 3, will generally perform or function as in the first form as has been described.

The pipes and elements for pressure work fluid flow generally constitute a closed circuit flow, but this may be as desired in any specific construction. The circuit may include any reservoir means in addition to that constituted by the lower part of the condensor chamber 24, such additional reservoir means being included in any manner if determined to be necessary. The pump-compressor means may be designed to produce a pressure lower than atmospheric pressure if that be determined as advisable in any construction in 24. The pump-compressor will in any case supply the work fluid as condensed to the pressure generator coil or other generator design 28 at a pressure such that the work fluid when delivered to the inlet chamber 6 will have a high pressure, and that should be as high as is found practicable whether the pressure determined will be 300 or 6 or even 1,000 pounds per square inch. As illustrated the turbines include blade means of the axial flow design, but the nature of the flow and type of blade means may be of any known design or as may be found satisfactory for efficiency.

The general operation and use of the device is now described. Referring first to the form presented in FIGS. 1, 2, 3, the unit which is as an entirety designated as A-B-C- FIG. 1, is mounted and fixed on a chassis in any place where there may be unobstructed discharge rearwardly of the unit A-B-C- and that may be either at the front end or rear end or at sides of the chassis, although in the FIG. 3 it is mounted at the extreme rear of the vehicle chassis as shown in FIG. 3. Thus in FIG. 1, the units there included in the exterior casing structure 35 includes, the turbine A, the electric generator (electric) C and the air-fan B, and all of these are at the rear end of the chassis in casing structure 35. The pressure fluid generator -C- is located at the front end of the chassis and the electric motor drive to road wheels is at the rear end of the chassis.

The closed circuit, including the coil 28, the pump-compressor 37, the condensor chamber 24 are supplied with a work fluid which may be water only, water plus such a fluid as alcohol or freon gas or such a fluid as poly-water, a fluid which will not freeze at ordinary freezing temperature, or it may be another type of fluid suitable for heating and condensing, and the quantity may be as is found most suitable. The fuel delivery 36 may be and is of any type as used in motor vehicles, and may be liquid or gaseous. The intention of the diagrammatic showing of combustion casing 29 and generator coil 28 and air intake and fuel delivery being that any known fluid heating means with any suitable supply of air and fuel may be used for heating of the work fluid by external combustion flow of combustion gases. The intention is also that such heating may be supplied by any known means Combustion of combustibles may be initiated in any manner.

For combustion usage air enters intake 30 and is combusted with fuel in the casing 29 to head coil 28 or fluid container of any form, and after combustion flows by pipe 31 discharge to atmosphere externally. The work fluid is started in circulation by electric motor 38 and the liquid flows to coil 28 and is highly heated and converted to steam or steam plus other fluid or is converted to pressurized gaseous fluid, according to the particular design for use. When lever 46 or other means is controlled to permit flow to the turbine inlet chamber 6, the high pressure fluid drives the turbine means to operate the electric generator C (armature 18) and the air-fan B. Operation of these results in production of air flow from atmosphere into intake 22 and the air flow through annular passage 23 and then through jet nozzle 26 and nozzle discharge 27 and outward to atmosphere, thus creating a propulsion ejection, which may be as powerful a propulsion as may designed by the power of the turbine means and the speed and size of the air-fan B. That flow will create a high reaction pressure in forward direction on the unit A-B-C and thereby on the chassis 44. The electric generator C, according to its control will produce work energy in electric motor 40 to drive shaft 41 and road wheels 43. Thus the work generated by the work fluid will contribute propulsive power to the chassis in the two ways, part of the work being provided by the electric drive and part of the work being provided by the air-fan propulsion.

In the form as in FIGS. 1,2,3, the one turbine provides all the work driving power. In the form shown in FIGS. 4,5,6, the work power is provided by the high pressure turbine A1 to drive the electric generator means and the low pressure turbine A2 provides the work energy and power for the air-fan propulsion. In either form the expansion and velocity of the pressure work fluid provides the propulsion for the vehicle. After passage through the turbine or two turbines in series (FIG. 4) the work fluid is expanded to near atmosphere pressure or near that (or to a vacuum low pressure) and the work fluid as discharged from the turbine means flows to the condenser chamber 24 (annularly about the jet nozzle means) and in chamber 24 is condensed by the flow of air at high speed from the air-fan, to the jet ejection nozzle 27 and this flow produces a very effective condensation by extraction of the heat therein, and thereby the work fluid is again converted to liquid and begins its circulation cycle again, and this circulation continues. The form illustrated in FIGS. 4,5,6, wherein there are the A1 and A2 turbines, provides a conduit 47 to connect the exhaust chamber 48 of turbine A1 with the inlet chamber 49 of turbine A2. Nozzle guides 50 direct flow in turbine A1 and nozzle guides 51 direct flow in turbine A2. Reservoir 52 is interposed in conduit 34 in FIG. 1.

The form illustrated in FIGS. 1,2,3, shows the air-fan -B- to have incidence change means, as described, whereby the direction of flow of the air by the air-fan may be reversed, so that this capability of reversal provides an air flow oppositely in direction to the normal direction of flow for forward travel, th,s reverse flow causing reaction impulse contravening the forward travel impulse of the vehicle, this reversal contributing effectively to braking effect and to ability of the vehicle to hold its travel direction firmly. This incidence change means is not shown in FIGS. 4,5,6, but it is contemplated that this second form may also include therein the direction reversal means by change of incidence.

The devices of this invention provide propulsion means of two kinds in combination, electric drive and air-fan thrust drive by air ejection. This division of work effect importantly diminishes the work energy necessary to be provided for a vehicle by kinetic energy transmission and such means can therefore be of lesser power provision, this diminishing the work wear of the mechanical transmission elements, while providing adequate propulsion energy.

It should especially be noted that the condenser chamber 24, which surrounds the annular passage 23 and the nozzle 26, provide means whereby the air flow from the air-fan -B- provides two functions, the jet ejection and thrust of the air flow for propulsion and, and the heat absorbing function of the condenser chamber 24, so that thus the condensing capacity necessary for effective and adequate condenstion, as is most essential in closed circuit work fluid means, is adequately provided. The capacity of the air-fan and ejection nozzle are proportioned in use for effective thrust.

In illustration and description of the invention, I have included as the primary engine unit or means, a form of turbine bladed rotor means, but it should be noted that it is contemplated that any form of rotor means, such as bucket type turbine rotors may be used in the realization of the invention, and this is within the contemplation of the claims. It should further be noted and understood that it is contemplated that any other type of primary engine unit may be included as a substitute for the primary engine unit and such primary engine unit may in various forms, be such as reciprocable piston engines, rotary piston engines such as the "wankel," or such as vane type rotor engines. The primary engine unit or means contemplated is intended to comprehend any type of primary engine means producing kinetic energy for driving the different power propulsion means by use of a liquid or gaseous work fluid subjected to pressurized and heated flow in the primary engine means.

While I have shown particular devices and combinations of devices in the illustration and description of my invention, it is contemplated that other devices and combinations of devices may be used in the realization of my invention without departing from the spirit and intention thereof.

What I claim is:

1. In vehicle populsion means: pressurized work fluid generator means having work fluid container space within jacket walls and having means supplying work fluid to the container space and having container outlet; (external heat supply to the work fluid jacket walls by supply and flow of combustion fuel and air flow in combustion duct passage in heat transfer relation through the jacket walls with the work container space; ) air fuel supply means for supplying combustible air fuel mixture to burner means in said generator, the combustion products flowing to the work fluid jacket walls from combustion duct passage and being in heat transfer relation through the jacket walls within the wok fluid container space; air-fan duct having rotary air fan therein to induct air and expel air by jet ejection outlet for propulsion effect; primary engine means receiving pressurized and heated work fluid from the work fluid outlet and having work fluid exhaust; the primary engine means (having work transmission by) including electric generator means for electromagnetic transmission to vehicle road wheel means; the primary engine means having work transmission by rotatable connection with the rotary air fan for propulsion ejection.

2. A propulsion means for vehicles including: in combustion: a work fluid generator means, and engine means by which energy of the work fluid generator means is utilized, and a condenser unit to which work fluid is exhausted from the engine means for condensation and accumulation for return to the work fluid generator means and recycling; the work fluid generator means comprising container space for heat absorption by conducted work fluid, having heat transfer walls for containing work fluid, having adjacent combustion chamber space and having means delivering fuel for combustion to the combustion chamber space and having means delivering air for combustion to the combustion chamber space and means for discharging of gases from the combustion chamber space; means for delivery of work fluid to the generator space from the condenser unit; the engine means comprising turbine casing means and turbine rotor means having blade means therewith for impact of pressurized work fluid and haaving work fluid intake and work fluid outlet and work energy transmission means; the condenser unit comprising condenser space within condenser jacket walls and intake and discharge for the work fluid and including ejection duct adjacent to the condenser jacket walls for heat transfer from work fluid in the condenser space to air flowing in the ejection duct; air intake to the ejection duct and air ejection for jet propulsion; air fan means in the ejection duct to propel air from the air intake and through the ejection duct to exit; the air fan having driving connection with said work energy transmission means; the work energy transmission means having driving transmission means to road wheel means for driving thereof.

3. The propulsion means as defined in claim 2 wherein: the turbine rotor means furth includes one division driving the air fan and another section thereof drawing the road wheel means through electromagnetic transmission means. motor 4. The propulsion means as defined in claim 2 wherein: the turbine rotor means further includes two sections one of which drives the air fan and another of which drives the road wheel means through the work energy transmission means; the work energy transmission means comprising an electric generator means driven by one section of the turbine rotor means and as having electric motor means receiving electric energy from the electrid generator means.

5. In vehicle propulsion means: work fluid producing means including work fluid space within jacket walls, work fluid supply means delivering under pressure into said work fluid space; outlet means from said work fluid space; combustion chamber space externally of said jacket walls and in heat transfer relation with said jacket walls; air and fuel mixture supply to said combustion chamber space, discharge from said combustion chamber space; turbine rotor means receiving pressurized work fluid by said discharge outlet means; electric generator means having driving connection with at least part of said turbine rotor means to be driven thereby; electric motor means having driving connection with road wheel means for transmission of energy from said electric generator means; airfan means rotatable in jet duct means said jet duct means having air intake from ambient air at one and thereof and having jet ejection at an opposite end for jet propulsion thrust.

6. The propulsion means as defined in claim 5 and: the said jet duct means having formation in a jet duct wall means which includes therein condenser space, the said condenser space having connection in the work fluid circuit to receive expanded work fluid for heat extraction and return of condensed work fluid to the work fluid supply means.

* * * * *